(12) United States Patent
Garcea et al.

(10) Patent No.: US 7,516,140 B2
(45) Date of Patent: Apr. 7, 2009

(54) DENSE FORMATS FOR MEDIA METADATA

(75) Inventors: Federico Garcea, Sunnyvale, CA (US); David D Good, Redmond, WA (US); David N Junod, Evans, GA (US); Kevin T. Carle, Mountain View, CA (US); Landon M Dyer, Medina, WA (US); Peter T. Barrett, Palo Alto, CA (US); Samuel Thomas Scott, III, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/421,008

(22) Filed: May 30, 2006

(65) Prior Publication Data

US 2007/0282901 A1 Dec. 6, 2007

(51) Int. Cl.
*G06F 17/00* (2006.01)
*G06F 13/00* (2006.01)

(52) U.S. Cl. .................................... 707/100; 725/42

(58) Field of Classification Search ............... 707/1–10; 725/42
See application file for complete search history.

(56) References Cited

U.S. PATENT DOCUMENTS

2002/0138834 A1* 9/2002 Gerba et al. .................. 725/42
2004/0003400 A1* 1/2004 Carney et al. ................. 725/42

* cited by examiner

*Primary Examiner*—Hosain T Alam
*Assistant Examiner*—Navneet K Ahluwalia
(74) *Attorney, Agent, or Firm*—Lee & Hayes, PLLC (57) ABSTRACT

Raw media metadata can be packaged as dense media metadata via a compression operation. In a described implementation, metadata for a media item is defined with a media item entry that references instances of property values in one or more property tables.

18 Claims, 7 Drawing Sheets

DENSE FORMATS FOR MEDIA METADATA

BACKGROUND

The number and variety of televisions channels today is tremendous. Viewers of cable, satellite, and other television subscription services can often choose from among many dozens and even hundreds of channels. It is therefore possible that a viewer is choosing which programs to watch from among thousands of available programs during any given week. The variety of channel options and the number of programs that are provided each week is so immense that television subscribers greatly benefit from using an electronic program guide (EPG).

An EPG can indicate, among other things, what programs are on which channels at any given time throughout a week. An EPG can thus have information about thousands of television programs that are scheduled and available for viewing during each week. The number of available programs also continues to increase. Consequently, the data size of an EPG is large and growing larger. It can be difficult to transmit the EPG to cable and satellite set-top boxes, as well as to store it at the set-top boxes, because of the large amount of data in the EPG.

SUMMARY

Raw media metadata can be packaged as dense media metadata via a compression operation. In a described implementation, metadata for a media item is defined with a media item entry that references instances of property values in one or more property tables.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

As described above, the size of the data for an EPG can become unwieldy with regard to its transmission to client devices, with regard to its storage at client devices, and so forth. The EPG data can be compressed using a generic compression algorithm (e.g., LZ or static Huffman encoding). However, generic compression algorithms encounter problems in relation to enabling random access, in relation to enabling global data factoring for repetitive data that is separated by substantial amounts of other data, and in relation to enabling the extraction of desired tables or table portions. Moreover, such generic compression algorithms are unable to take advantage of the special characteristics of EPG data.

In other words, compression of EPG data can be improved when the domain of the underlying data is considered. Identical individualized data instances can exist repeatedly throughout the original EPG data and be separated by significant other data. In a described implementation, unique instances of such data are placed in "global" property tables that can be referred to repeatedly by different program schedule entries. EPG data that is compressed as described herein may also be organized into different portions by channel or channels and into different portions by time frames. The resulting granularity flexibility can facilitate transmissions in bandwidth-limited environments.

Figure 1:
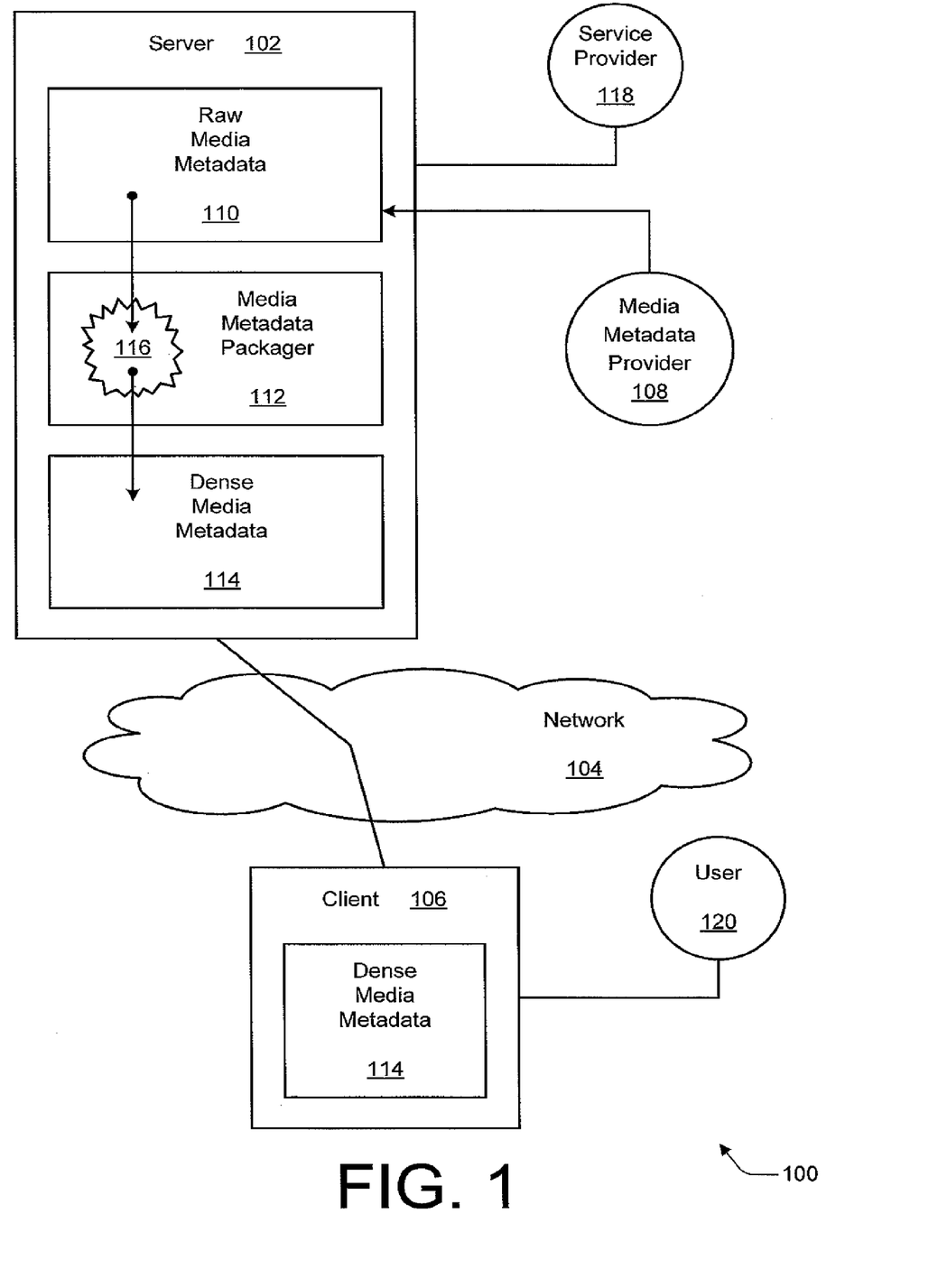
FIG. 1 is an example environment in which dense formats for media metadata may be implemented by packaging raw media metadata into dense media metadata.

FIG. 1 is an example environment 100 in which dense formats for media metadata may be implemented by packaging raw media metadata 110 into dense media metadata 114. As illustrated, environment 100 includes a server 102, a network 104, a client 106, and media metadata provider 108. Server 102 includes raw media metadata 110, a media metadata packager 112, and dense media metadata 114. Client 106 includes dense media metadata 114 after receiving it from server 102. Server 102 represents a service provider 118, such as a cable or satellite television service provider. Client 106 represents a user 120, such as a viewing subscriber.

Although only a single server 102 and service provider 118 are explicitly illustrated in environment 100, multiple service providers 118 may exist, each with multiple servers 102. Similarly, although only a single client 106 and user 120 are shown, there may be multiple such clients 106 and/or users 120 that are being served by one or more servers 102. Server 102 and client 106 include processing as well as processor-accessible storage and transmission media resources that are sufficient to perform their respective functions as described herein. Example device hardware, software, etc. for a server 102 and/or a client 106 are described herein below with particular reference to FIG. 8.

Server 102 and client 106 can communicate over network 104. Network 104 may be any given network or combination of networks. Examples include, but are not limited to, the internet, a telephone network, a cable network, a satellite network, a fiber optic network, a local or wide area network (LAN or WAN), a wireless or wired network, some combination thereof, and so forth. Server 102 may, by way of example only, form part of a so-called head-end of a television-based network, such as a cable network.

Media metadata provider 108 provides raw media metadata 110 to server 102. Media metadata provider 108 provides channel lineups, schedules, program information, etc. for one or more channels. Media metadata provider 108 may be the network or company that produces the one or more channels.

In a described implementation, media metadata packager 112 accepts raw media metadata 110 and packages it into dense media metadata 114. The packaging is effectuated using a compression operation 116. Compression operation 116 and example formats for dense media metadata 114 are described further herein below. Media metadata packager 112 may be realized as hardware, software, firmware, some combination thereof, etc. at server 102.

After raw media metadata 110 is formatted into dense media metadata 114 by compression operation 116, dense media metadata 114 may be transmitted to client 106 via network 104. Dense media metadata 114 may be transmitted as a monolithic whole or in more-digestible chunks that are segmented by channel, by scheduling time-frame, by some combination thereof, and so forth. At client 106, dense media metadata 114 may be used to present an electronic media guide to user 120, either with or without decompression.

Figure 2:
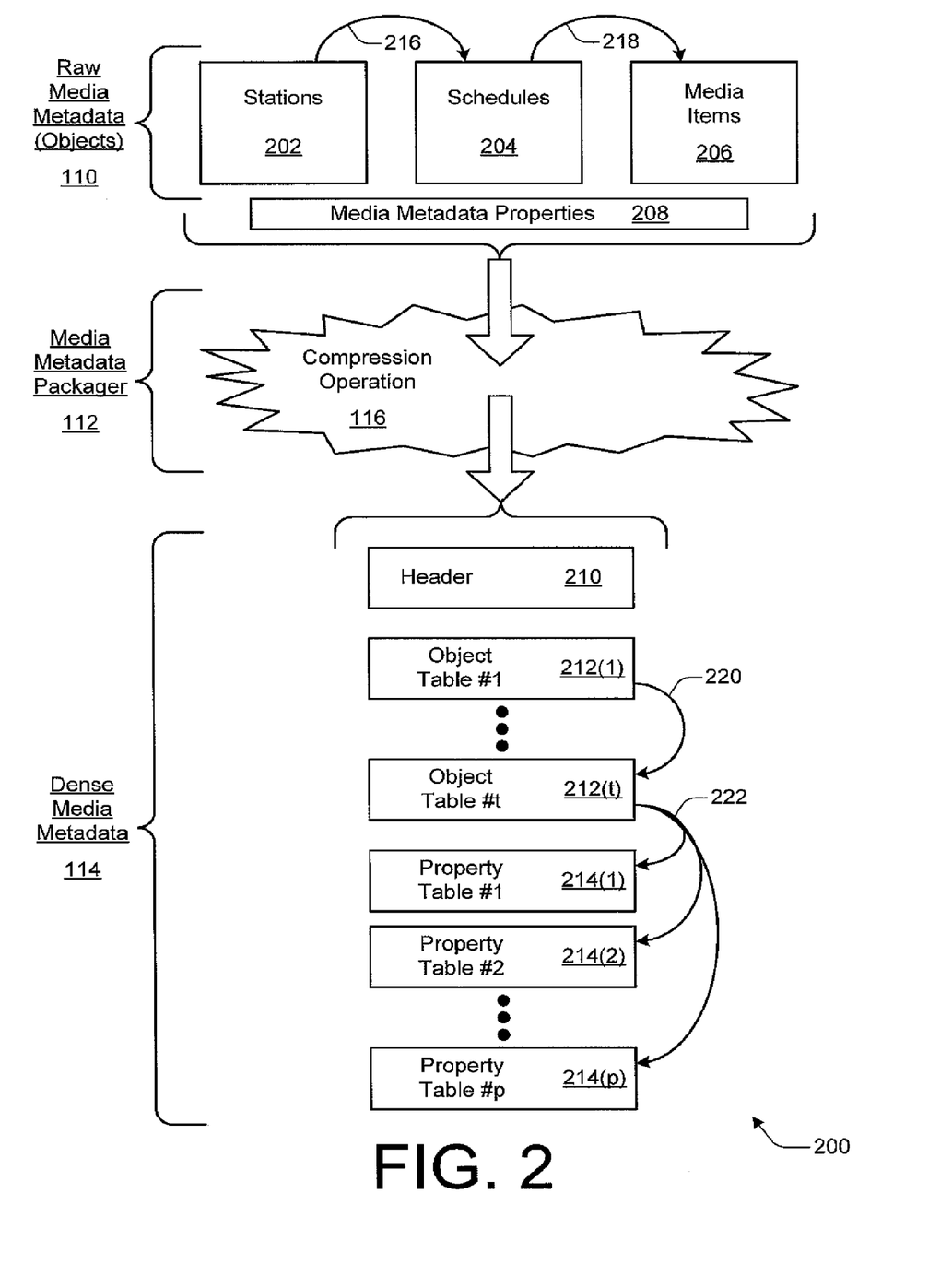
FIG. 2 is a block diagram of an example compression operation to package raw media metadata into dense media metadata having object tables and property tables.

FIG. 2 is a block diagram 200 of an example compression operation 116 to package raw media metadata 110 into dense media metadata 114 having object tables 212 and property tables 214. As illustrated, media metadata packager 112 performs compression operation 116 on raw media metadata 110 to produce dense media metadata 114. Raw media metadata 110 includes three data objects: stations 202, schedules 204, and media items 206. Dense media metadata 114 includes a header, at least one object table 212, and one or more property tables 214.

In a described implementation, media metadata provider 108 provides raw media metadata 110 in the form of one or more data objects. Example data objects include, by way of example but not limitation, stations 202, schedules 204, and media items 206. Stations object 202 refers 216 to schedules object 204, and schedules object 204 refers 218 to media items object 206.

Stations object 202 identifies the station(s) that are relevant to raw media metadata 110. Schedules object 204 delineates the availability (e.g., time, channel, etc.) of the referenced media items. Media items object 206 describes the available media items. Media items 206 may include, by way of example but not limitation, the following media item types: television programs, movies, video-on-demand (VOD) assets, video clips, images, managed applications, audio clips, audio-visual clips, some combination thereof, and so forth. The included description of each media item may vary depending on its media item type as well as the actual individual media item.

Raw media metadata 110 is comprised of (still raw) media metadata properties 208. Any of stations objects 202, schedules objects 204, and media items objects 206 may include one or more such media metadata properties 208. For example, the descriptions of media items in media items 206 include media metadata properties 208. Example media metadata properties are described herein below with particular reference to FIG. 3 and with particular regard to an example television program type of media item.

In a described implementation, media metadata properties 208 in their raw form are extracted during compression operation 116 by media metadata packager 112. The extracted media metadata properties 208 are then inserted into entries to build property tables 214 of dense media metadata 114. The referencing 218 between schedules object 204 and media items object 206 and the referencing 216 between stations object 202 and schedules object 204 is then reflected in dense media metadata 114 using object tables 212.

As illustrated, dense media metadata 114 includes header 210, multiple object tables 212, and multiple property tables 214. More specifically, "t" (where "t" is an integer) object tables 212 are shown: object table #1 212(1) . . . object table #t 212(t). Also, "p" (where "p" is an integer) property tables 214 are shown: property table #1 214(1), property table #2 214(2) . . . property table #p 214(-p).

In a described implementation, certain object table(s) 212 reference the properties in property tables 214. For example, a media item entry of, e.g., object table #t 212(t) may reference 222 three property tables #1, #2, and #p 214(1, 2, p). Similarly, a schedule entry of, e.g., object table #1 212(1) may reference 220 object table #t 212(t).

Although a specific example dense media metadata 114 data structure is illustrated in FIG. 2 and described herein above, a given dense media metadata 114 data structure may include any number of object tables 212 and/or property tables 214. Each object table 212 may reference any number of other object tables 212 and/or one or more property tables 214. Similarly, a property table 214 may reference one or more other property tables 214. Furthermore, the referencing may be direct and/or indirect.

Figure 3:
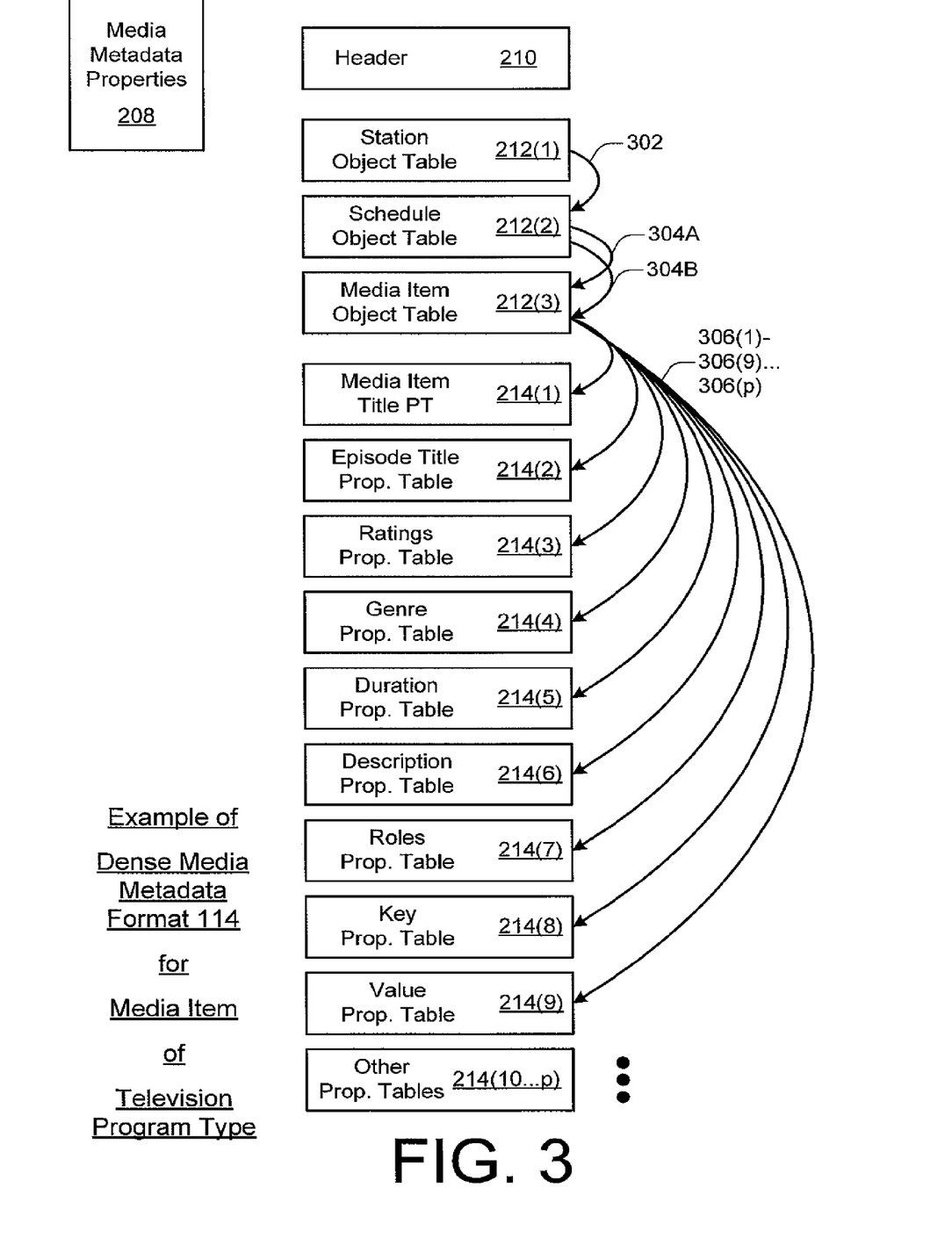
FIG. 3 is a block diagram of an example dense media metadata format having specific object and property table examples.

FIG. 3 is a block diagram of an example dense media metadata 114 format having specific object and property table examples. The specific object and property table examples relate to media items of a television program type. However, the examples of FIG. 3 may also relate to other media item types.

As illustrated, the format of dense media metadata 114 includes a header 210, three object tables 212(1, 2, 3), and "p" property tables 214(1-9, 10 . . . p). Header 210 may include, for example, general information relating to relevant schedule time frames, communication parameters, version information, decompression codes and/or instructions, some combination thereof, and so forth.

The illustrated three object tables 212 are: station object table 212(1), schedule object table 212(2), and media item object table 212(3). Schedule object table 212(2) need not include actual broadcast times for certain media items (e.g., VOD assets, audio and/or visual clips, etc.). Although three object tables 212(1, 2, 3) are shown, fewer or more than three object tables 212 may alternatively be present.

The illustrated "p" property tables 214 are: media item title property table 214(1), episode title property table 214(2), ratings property table 214(3), genre property table 214(4), duration property table 214(5), description property table 214(6), roles property table 214(7), key property table 214(8), value property table 214(9) . . . other property tables 214 (10 . . . p). The other property tables block represents that many other alternative media item properties may be included in the standard formatting. Key-value pairs of key property table 214(8) and value property table 214(9) enable the standard dense formatting to be extended for new and/or less-frequently-used properties. Key-value pairs are described further herein below with particular reference to FIG. 7.

For a television series, for example, media item title property table 214(1) corresponds to the title of the television series, and episode title property table 214(2) corresponds to a title of a particular episode of the television series. Ratings properties may be, for example, general ratings such as "PG", "R", "TV-Y", "TV-G", and so forth. Ratings properties may also be specific as to violence (V), language (L), and so forth. Genre properties relate to media item categories such as sports, news, drama, comedy, science-fiction, family, reality, educational, and so forth. Duration properties indicate the length of the media item. Description properties are typically a text string that provides additional information about a series generally or an episode particularly. Role properties relate to actors, actresses, directors, produces, and other creative artists starring in or otherwise creating the corresponding media item.

To package raw media metadata 110 (of FIGS. 1 and 2) into a dense media metadata format 114 for a media item of a television program type, the property instances of media metadata properties 208 (of FIG. 2) are extracted. They are extracted from stations 202, schedules 204, and/or media items 206. In this example, the television program media metadata properties 208 are extracted principally from media items object 206.

The respective extracted property instances are then inserted into the corresponding respective property tables 214. In other words, television program titles are inserted into media item title property table 214(1), episode titles are inserted into episode title property table 214(2), ratings are inserted into ratings property table 214(3), and so forth. In this manner, property tables 214 are built from media metadata properties 208.

In a described implementation, each property may be converted into a string as appropriate prior to insertion into a property table 214. As part of the compression, a string that would be a duplicate to one already inserted is not inserted again. Because so many property instances are repeated in an electronic media guide, avoiding their duplication and then referencing the property instances can result in a greater compression ratio than traditional standard compression algorithms. Moreover, standard compression may be applied to the strings in each property table to achieve a further size reduction. In other words, after performing compression operation 116 to package the objects of raw media metadata 110 into the tables of dense media metadata 114, the strings themselves may be compressed using some other scheme (e.g., adaptive Huffman coding, etc.).

Each media item entry of media item object table 212(3) is built by referencing to the corresponding property instance in the corresponding property table 214. References 306(1)-306(9) . . . 306(p) from media item object table 212(3) to respective property tables 214(1)-214(9) . . . 214(p) are shown. Each scheduling entry of schedule object table 212(2) is built by referencing 304A and 304B to the corresponding media item entry of media item object table 212(3). Each station entry in station object table 212(1) is built by referencing 302 to the appropriate part of schedule object table 212(2).

Dense media metadata format 114 may accommodate varying numbers of stations or channels, different scheduling time frames, different numbers of media items, and so forth. In fact, dense media metadata 114 may be relatively easily formatted or reformatted to a desired granularity and size. For example, a single channel may be represented for 24 hours, or multiple channels may be represented for 6 hours. Also, all available channels for a given subscription package may be represented for 7-14 days. As yet another example, media items of a selected genre or genres may be included while others are excluded. Other station, schedule, media item formulations may alternatively be implemented.

Figure 4:
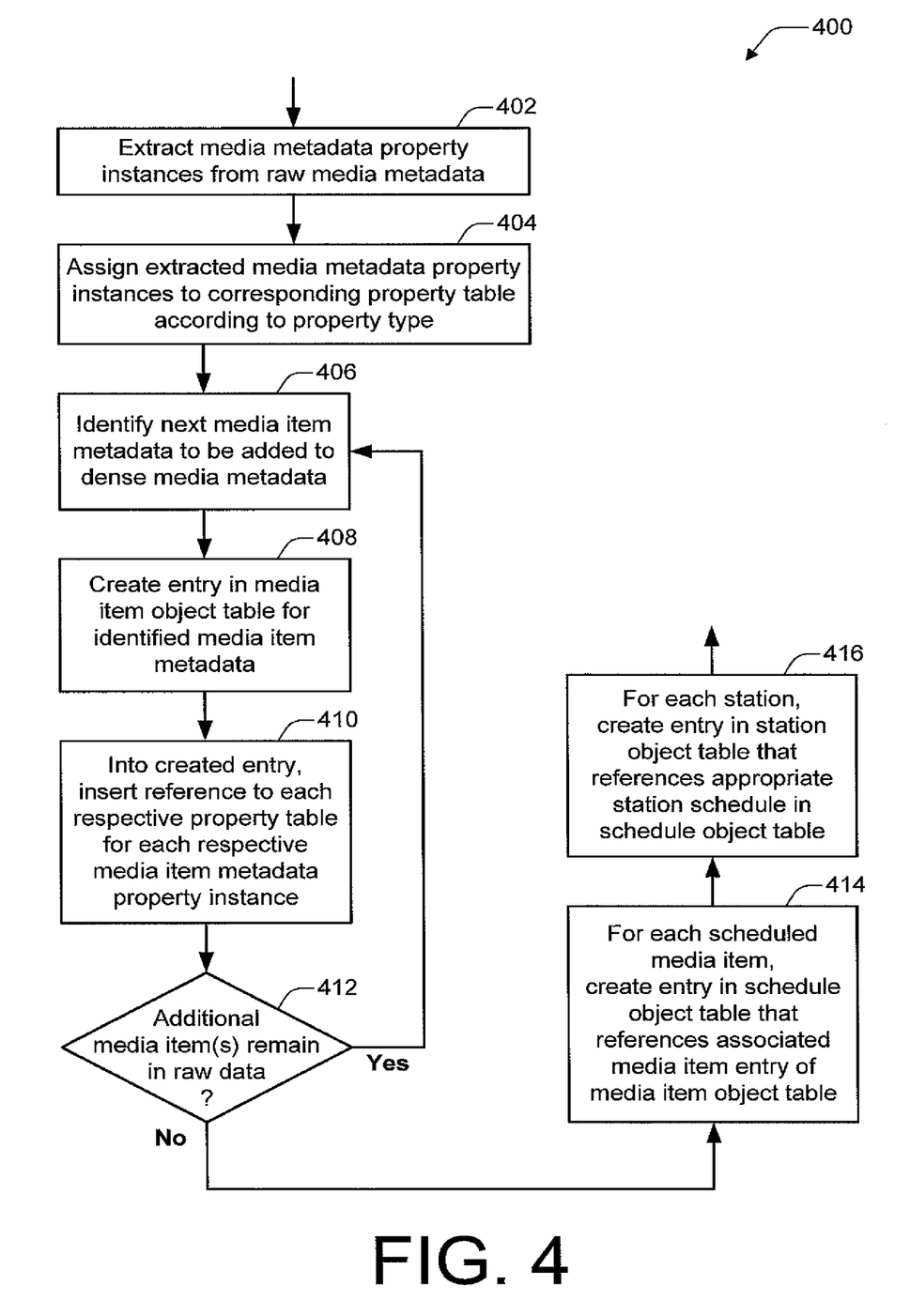
FIG. 4 is a flow diagram that illustrates an example of a method for packaging raw media metadata into dense media metadata.

FIG. 4 is a flow diagram 400 that illustrates an example of a method for packaging raw media metadata into dense media metadata. Flow diagram 400 includes eight (8) blocks 402-416. Although the actions of flow diagram 400 may be performed in other environments and with a variety of hardware, software, and data structure combinations, the media metadata dense format features and modules illustrated in FIGS. 1-3 may be used to implement the method of flow diagram 400. For example, a media metadata packager 112 performing a compression operation 116 may implement the method. These features and modules are referred to herein below to further explain the method.

At block 402, media metadata property instances are extracted from raw media metadata. For example, individual instances of (still raw) media metadata properties 208 may be extracted from raw media metadata 110, including from media items object 206.

At block 404, extracted media metadata property instances are assigned to corresponding property tables according to property type. For example, extracted individual instances of media metadata properties 208 may be assigned to (e.g., inserted into) corresponding property tables 214 according to their associated property type. For instance, each newly-encountered value for extracted media item durations may be inserted into duration property table 214(5). Upon completion of the actions of blocks 402 and 404, property tables 214 of dense media metadata 114 have been built.

At block 406, the next media item metadata that is to be added to the dense media metadata is identified. For example, the first, second, and then subsequent media items from media items object 206 that have not yet been added to dense media metadata 114 may be identified.

At block 408, an entry in the media item object table for the identified media item metadata is created. For example, an entry for the identified media item metadata may be created in media item object table 212(3). An example entry for each media item metadata in media item object table 212(3) is described herein below with particular reference to FIG. 5.

At block 410, into the created entry, a reference is inserted to each respective property table for each respective media item metadata property instance. For example, a reference 306 pointing to each respective property table 214 for each respective media item metadata property instance (e.g., title, duration, roles, ratings, etc.) may be inserted into the entry created in media item object table 212(3). Examples of such references are described further herein below with particular reference to FIG. 5.

At block 412, it is determined if additional media item(s) remain in the raw data. For example, it may determined if there are additional media items remaining in media items object 206 of raw media metadata 110. If so, then the method of flow diagram 400 returns to block 406. If not, then the method continues at block 414.

At block 414, for each scheduled media item, an entry in the schedule object table that references the associated media item entry of the media item object table is created. For example, for each scheduled media item, an entry in schedule object table 212(2) that references 304 the associated media item entry of media item object table 212(3) may be created At block 416, for each station, an entry in the station object table that references the appropriate station schedule in the schedule object table is created. For example, for each station, an entry in station object table 212(1) that references 302 the appropriate station schedule in schedule object table 212(2) may be created. Upon completion of the actions of blocks 406 to 416, object tables 212 of dense media metadata 114 have been built.

Figure 5:
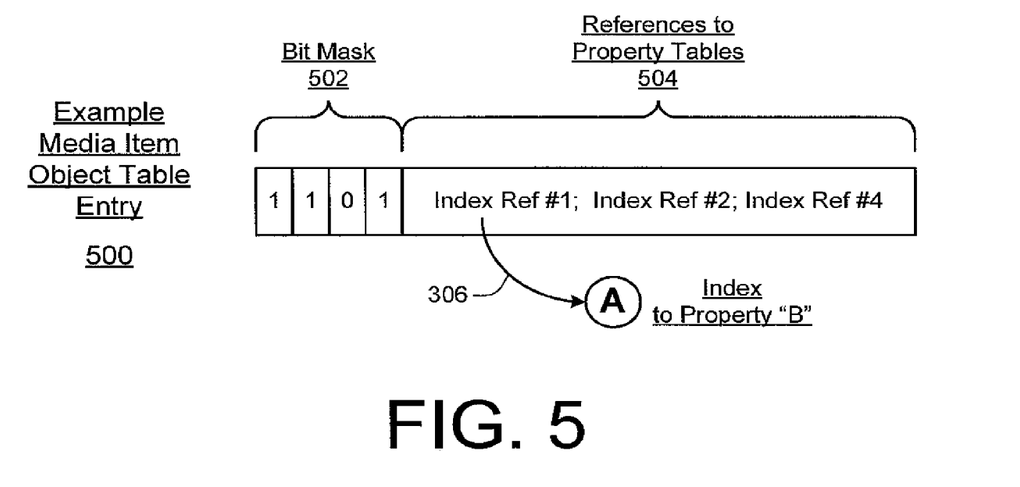
FIG. 5 is a block diagram of an example media item entry for a media item object table.

FIG. 5 is a block diagram of an example media item object table entry 500 for a media item object table 212(3) (of FIG. 3). A media item object table entry 500 is created for each media item as is described herein above for blocks 408 and 410 of flow diagram 400 (of FIG. 4). As illustrated, media item object table entry 500 includes two parts: a bit mask 502 and a references to property tables part 504.

Example bit mask 502 includes four bits "1101". Hence, references to property tables 504 includes up to four references 306. These references are: "Index Reference #1; Index Reference #2; Index Reference #4". Although four bits and up to four references are illustrated in example media item object table entry 500, actual implementations may have any number of bits and corresponding reference maximums to accommodate fully the number of different property types and associated property tables 214.

In a described implementation, references to property tables 504 includes multiple respective references 306 to multiple respective property tables 214. Bit mask 502 includes a number of bits that indicate whether a particular reference is present in references to property tables 504. In other words, if the media item corresponding to media item object table entry 500 does not have an instance of a particular property type, then no reference to the associated property table 214 is present in media item object table entry 500. This can save space and increase the compression ratio.

In the illustrated example, there are four different possible property types. The corresponding media item has three instances of the four possible property types. As indicated by the "1101" bit mask pattern of bit mask 502, there are references to the first, second, and fourth property tables 214. There is no reference to the third property table 214.

Figure 6:
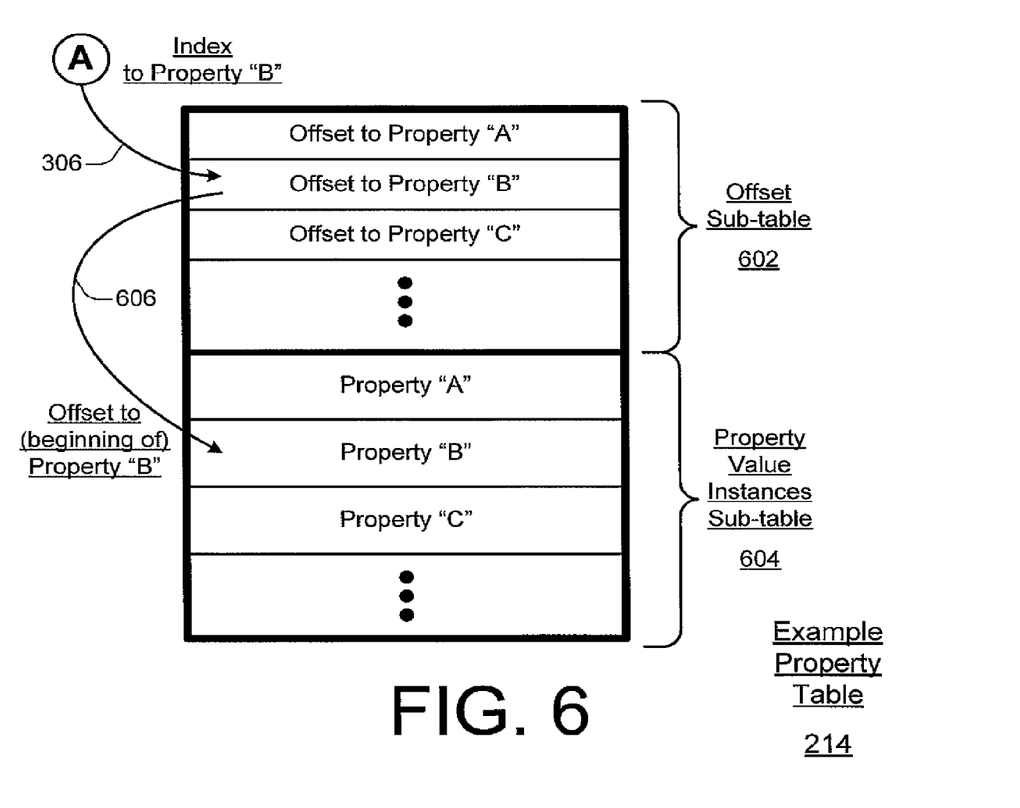
FIG. 6 is a block diagram of an example general property table having an offset sub-table and a property value instances sub-table.

For an example that is continued in the description of FIG. 6, the index reference #1 is also represented by reference arrow 306. Reference arrow 306 is a pointer to or an index to property "B" in a property table 214. As indicated by the encircled "A", reference arrow 306 points to a property instance in example property table 214 of FIG. 6.

FIG. 6 is a block diagram of an example general property table 214 having an offset sub-table 602 and a property value instances sub-table 604. Property values sub-table 604 includes a number of property values from media metadata properties 208. The illustrated property examples are: property "A", property "B", property "C", and so forth. Offset sub-table 602 includes a number of offsets to the property values included in property values sub-table 604. The illustrated offset examples are: offset to property "A", offset to property "B", offset to property "C", and so forth.

Dense formats for media metadata may be implemented with property tables 214 that omit an offset sub-table 602. In such cases, references 306 may point directly to the property value instances within property values sub-table 604. However, the compression ratio can sometimes be increased by using offsets, especially when the lengths of the property values in property values sub-table 604 are sufficiently great and the number of references 306 to them from media item object table 212(3) is sufficiently frequent.

In short, the overall size of dense media metadata 114 may often be decreased by using the index-offset approach described here with particular reference to FIG. 6. Typically, the total number of entries in a property table 214 is much less than the total number of bytes occupied by the string-based property value instances. Accordingly, judiciously-selected index and offset sizes can increase the compression ratio.

The size of the index to property "B", or reference 306, may be scaled in relation to the number of entries in the property table 214. For example, 4, 8, 16, 32, etc. bits may be selectively used for each index. If there are 256 or fewer entries in a given property table 214, then the index size referencing into that property table 214 may be as small as 1-byte. A property table that has up to 65,536 entries may be referenced with indexes that are 2-byte integers.

When a reference 306 indexes into the offset to property "B" field of offset sub-table 602, the offset 606 to property "B" is then followed. By way of example only, the offset 606 may be to the beginning of the property "B" entry and may be calculated with regard to the beginning of the overall property table 214. The offsets are of a size that reflects the total number of bytes consumed by property values sub-table 604, but they may be limited to one incarnation in offset sub-table 602 instead of being repeatedly used in media item object table 212(3). As described herein, the smaller-sized indexes are repeatedly included in media item object table entries 500 of media item object table 212(3) to further reduce the overall size of dense media metadata 114.

Figure 7:
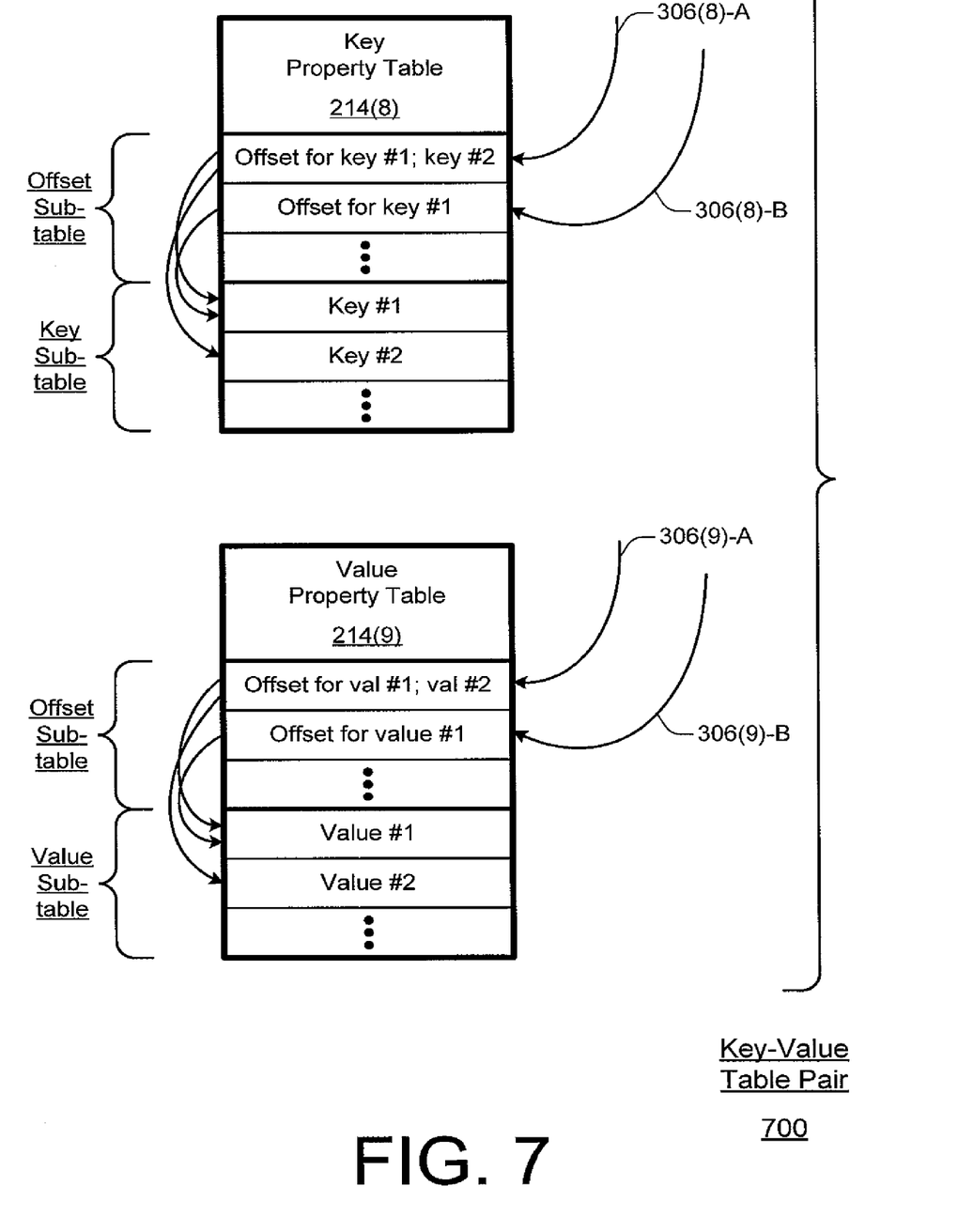
FIG. 7 is a block diagram of an example key and value property table pair that enables property types to be extended.

FIG. 7 is a block diagram of an example key and value property table pair 700 that enables property types to be extended. In a described implementation, there is a predetermined collection of standard property types. The standard property types may be, for example, those properties that are most common across a range of relevant media items. However, there are typically other property types that are neither unique nor exceptionally common. These recurring, but perhaps not common, property types are handled with a described key-value pair scheme. The key-value pair scheme may also be used for unique property types.

With initial reference to FIG. 3, an entry in media item object table 212(3) may reference a key-value pair with a reference 306(8) to key property table 214(8) and a reference 306(9) to value property table 214(9). This is a reference pair 306(8/9) to key-value property table pair 214(8/9). The reference pair 306(8/9) references both a key and its associated value. The key identifies or defines the particular media item property type that takes the associated value for the corresponding media item entry that has the reference pair 306(8/9).

With reference now to FIG. 7, key-value property table pair 214(819) is illustrated as key property table 214(8) and value property table 214(9). Each key property table 214(8) includes an offset sub-table and a key sub-table. Each value property table 214(9) includes an offset sub-table and a value sub-table.

In the illustrated example, there are two different key-value pairs A and B. Key-value pair A is from a first entry in media item object table 212(3), and key-value pair B is from a second entry in media item object table 212(3).

In the first example (A), reference 306(8)-A points to an offset field in the offset sub-table of key property table 214(8). The referenced field has an offset for key #1 and an offset for key #2. Hence, the corresponding media item has two key-value pairs. The field therefore has offsets pointing to "Key #1" and to "Key #2", as indicated by the referencing arrows. These keys define the meaning behind the associated values. Reference 306(9)-A points to an offset field in the offset sub-table of value property table 214(9). The referenced field has an offset for value #1 and an offset for value #2. The field therefore has offsets pointing to "Value #1" and to "Value #2", as indicated by the referencing arrows.

In the second example (B), reference 306(8)-B points to an offset field in the offset sub-table of key property table 214(8). The referenced field has an offset for key #1. Hence, the corresponding media item has one key-value pair. The field therefore has an offset pointing to "Key #1", as indicated by the referencing arrow. This key defines the meaning behind the associated value. Reference 306(9)-B points to an offset field in the offset sub-table of value property table 214(9). The referenced field has an offset for value #1. The field therefore has an offset pointing to "Value #1", as indicated by the referencing arrow.

Consequently, the media item of the first entry in media item object table 212(3) has a "Key #1" property with a "Value #1" value and has a "Key #2" property with a "Value #2" value. The media item of the second entry in media item object table 212(3) has a "Key #1" property with a "Value #1" value. In this manner, key-value pairs may be shared between and among different media items without repeating the data for the key-value pairs. Moreover, sets of key-value pairs may also be shared between and among different media items without repeating the data for the sets of key-value pairs.

Figure 8:
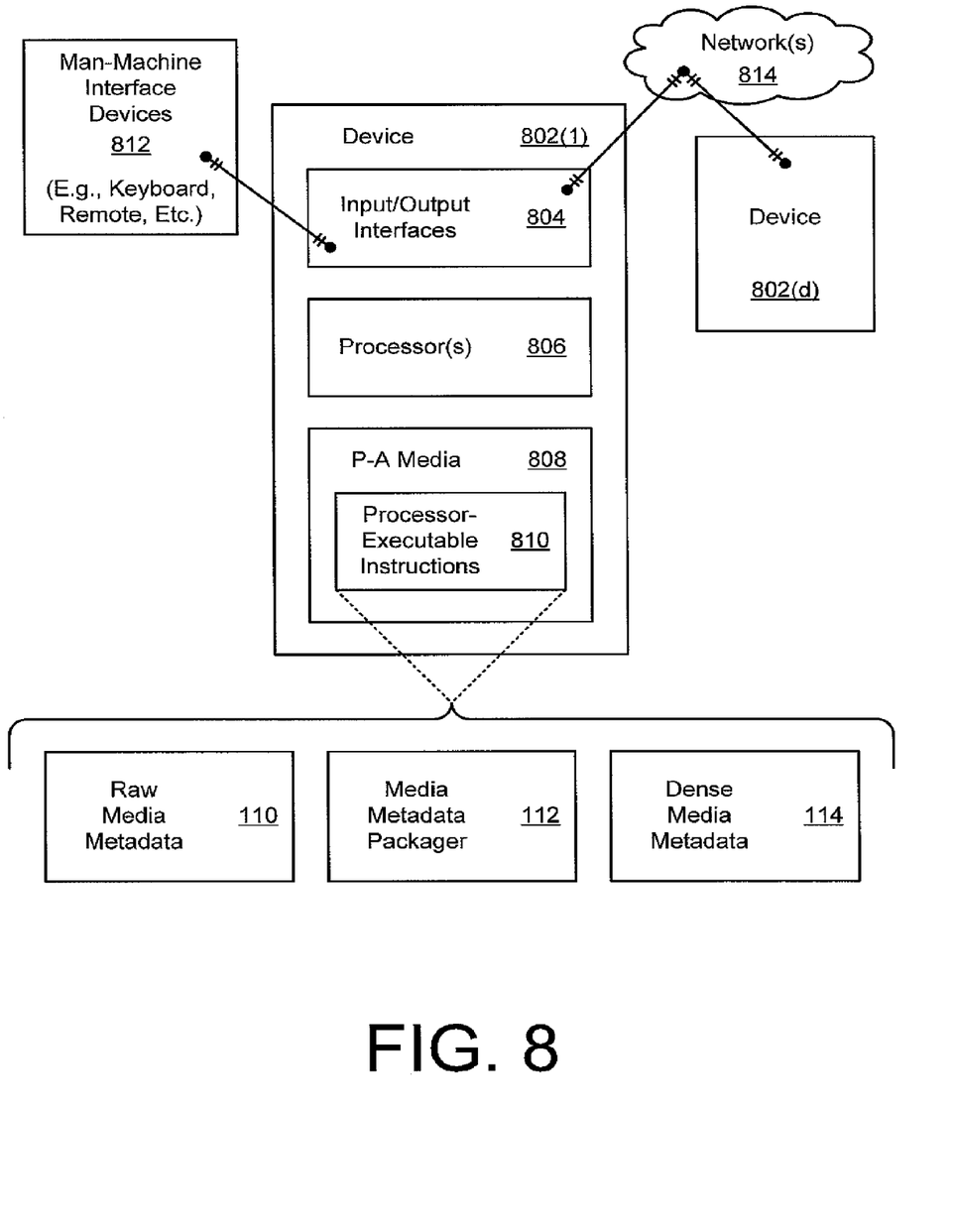
FIG. 8 is a block diagram of an example device that may be employed in conjunction with dense formats for media metadata.

FIG. 8 is a block diagram of an example device 802 that may be employed in conjunction with dense formats for media metadata. For example, a device 802 may create, store, transmit, receive, utilize, or otherwise implement a dense media metadata 114 data structure as described herein. In certain implementations, devices 802 are capable of communicating across one or more networks 814, such as network 104. As illustrated, two devices 802(1) and 802(d) are capable of engaging in communication exchanges via network 814. Example relevant communication exchanges include those between a server 102 and a client 106 relating to transmitting and/or receiving dense media metadata 114.

Generally, device 802 may represent a server or a client device; a storage device; a workstation or other general computer device; a set-top box or other television device; a personal digital assistant (PDA), mobile telephone, or other mobile appliance; some combination thereof; and so forth. As illustrated, device 802 includes one or more input/output (I/O) interfaces 804, at least one processor 806, and one or more processor-accessible media 808. Processor-accessible media 808 includes processor-executable instructions 810. Although not specifically illustrated, device 802 may also include other components.

In a described implementation of device 802, I/O interfaces 804 may include (i) a network interface for communicating across network(s) 814, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a television or other screen to render an electronic media guide. Examples of (iii) man-machine device interfaces include those that communicate by wire or wirelessly to man-machine interface devices 812 (e.g., a keyboard or keypad, a mouse or other graphical pointing device, a remote control, etc.).

Generally, processor 806 is capable of executing, performing, and/or otherwise effectuating processor-executable instructions, such as processor-executable instructions 810. Processor-accessible media 808 is capable of being locally or remotely accessed by a processor. In other words, processor-accessible media 808 may include processor-executable instructions 810 that are executable by processor 806 to effectuate the performance of functions by device 802.

Thus, realizations for media metadata dense formats may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Processor-accessible media 808 may be any available media that is included as part of and/or accessible by device 802. It includes volatile and non-volatile media, removable and non-removable media, and storage and transmission media (e.g., wireless or wired communication channels). For example, processor-accessible media 808 may include an array of disks for longer-term mass storage of processor-executable instructions, random access memory (RAM) for shorter-term storage of instructions that are currently being executed, flash memory for medium to longer term storage, optical disks for portable storage, and/or link(s) on network 814 for transmitting dense media metadata 114 or other communications, and so forth.

As specifically illustrated, processor-accessible media 808 comprises at least processor-executable instructions 810. Generally, processor-executable instructions 810, when executed by processor 806, enable device 802 to perform the various functions described herein. Examples of processor-executable instructions 810 include, but are not limited to, raw media metadata 110 (including media metadata properties 208), media metadata packager 112, dense media metadata 114 (including object tables 212 and property tables 214), some combination thereof, and so forth.

The devices, actions, aspects, features, functions, procedures, modules, data structures, schemes, approaches, architectures, components, etc. of FIGS. 1-8 are illustrated in diagrams that are divided into multiple blocks. However, the order, interconnections, interrelationships, layout, etc. in which FIGS. 1-8 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for dense formats for media metadata.

Although systems, media, devices, methods, procedures, apparatuses, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A processor-accessible storage media comprising processor-executable instructions, the instructions comprising:

accepting a raw media metadata from a media metadata provider. wherein the raw media metadata comprises media metadata properties used as information populating an electronic program guide;

creating, by a processor, a dense media metadata data structure by extracting property instances of the media metadata properties from the raw media metadata for storing as compressed electronic program guide information, the dense media metadata data structure comprising:

a first property table that includes multiple property instances of a first property type corresponding to one of the media metadata properties extracted from the raw media metadata, wherein duplicate property instances as extracted are not permitted;

a second property table that includes multiple property instances of a second property type corresponding to a different one of the media metadata properties extracted from the raw media metadata, wherein duplicate property instances as extracted are not permitted;

a media item object table that includes multiple media item entries, each unique media item entry of the multiple media item entries referencing a corresponding property instance in a corresponding property table, at least one property instance of the first and second property tables, wherein each media item entry includes a bit mask indicating at least one property table referenced by the media item object;

a schedule object table that includes multiple schedule entries, each schedule entry of the multiple schedule entries referencing a single unique media item entry from among the multiple media item entries in the media item object table;

a station object table that includes multiple station entries; and a station entry of the multiple station entries referencing a single unique schedule entry from among the multiple schedule entries in the schedule object table; and transmitting the compressed electronic program guide information to a client device via a network.

2. The processor-accessible storage media as recited in claim 1, wherein the first property type and the second property type are selected from a group of property types comprising: media item title, episode title, rating, genre, duration, description, and roles.

3. The processor-accessible storage media as recited in claim 1, wherein the first property table comprises an offset sub-table and a property value instances sub-table; and wherein the property value instances sub-table includes multiple respective property value instances that are referenced by multiple respective offsets in the offset sub-table.

4. The processor-accessible storage media as recited in claim 3, wherein references to individual ones of the multiple property value instances of the first property table that are present in the multiple media item entries of the media item object table comprise indexes; and wherein a size of the indexes is established responsive to a total number of the multiple property value instances that are included in the property value instances sub-table.

5. The processor-accessible storage media as recited in claim 1, further comprising:

a third property table that includes multiple property instances of a third property type, the third property type comprising a unique definable key property that provides meaning to associated values; and a fourth property table that includes multiple property instances of a fourth property type, the fourth property type comprising a value property that holds data value instances that are associated with the unique definable key properties of the third property table.

6. A computer-implemented method having instructions executable by a processor, comprising:

accepting a raw media metadata from a media metadata provider, wherein the raw media metadata comprises media metadata properties used as information populating an electronic program guide;

creating, by the processor coupled to a memory, a dense metadata data structure by extracting media metadata property instances from the raw media metadata for storing as compressed electronic program guide information, wherein the dense metadata data structure comprises multiple respective property tables of multiple respective property types with no duplicate entries, wherein the property tables comprise:

a first property table that includes multiple property instances of a first property type corresponding to one of the media metadata properties extracted from the raw media metadata; and a second property table that includes multiple property instances of a second property type corresponding to a different one of the media metadata properties extracted from the raw media metadata;

assigning extracted media metadata property instances to corresponding property tables according to a property type of the extracted media metadata property instances;

creating a media item entry for corresponding media item metadata, wherein each media item entry is unique;

inserting into the media item entry a reference to at least one property table of the multiple property tables in accordance with the corresponding media item metadata; and transmitting the compressed electronic program guide information to a client device via a network;

wherein the dense metadata data structure further comprises:

a media item object table that includes multiple media item entries, each unique media item entry of the multiple media item entries referencing a corresponding property instance in a corresponding property table, at least one property instance of the first and second property tables, wherein each media item entry includes a bit mask indicating at least one property table referenced by the media item object;

a schedule object table that includes multiple schedule entries, each schedule entry of the multiple schedule entries referencing a single unique media item entry from among the multiple media item entries in the media item object table;

a station object table that includes multiple station entries; and a station entry of the multiple station entries referencing a single unique schedule entry from among the multiple schedule entries in the schedule object table.

7. The method as recited in claim 6, wherein the creating the dense metadata data structure comprises:

extracting media metadata property instances from the raw media metadata; and assigning the extracted media metadata property instances to the multiple respective property tables according to respective property types.

8. The method as recited in claim 7, wherein the inserting comprises:

inserting into the media item entry the reference to a media metadata property instance in the at least one property table of the multiple property tables, the media metadata property instance corresponding to the media item metadata.

9. The method as recited in claim 7, wherein the creating the dense metadata data structure farther comprises:

inserting the extracted media metadata property instances into property value instances sub-tables of the multiple property tables; and forming offset sub-tables that enable indexed referencing into the property value instances sub-tables of the multiple property tables.

10. The method as recited in claim 6, further comprising:

creating a scheduling entry in the schedule object table that references the media item entry.

11. The method as recited in claim 6, wherein the creating the media item entry comprises:

creating a bit mask for the media item entry, the bit mask indicating which property tables of the multiple property tables are referenced for the corresponding media item metadata.

12. The method as recited in claim 6, wherein the inserting comprises:

inserting into the media item entry a reference to a key property table and a reference to a value property table; wherein the reference to the value property table points to a value instance for the corresponding media item metadata, and the reference to the key property table points to a key that defines a property type for the value instance.

13. A processor-accessible storage media comprising processor-executable instructions that include a dense media metadata data structure, the dense media metadata data structure comprising:

multiple property tables with no duplicates, each respective property table of the multiple property tables associated with a respective property type, wherein the property tables comprise:

a first property table that includes multiple property instances of a first property type corresponding to one of the media metadata properties extracted from a raw media metadata accepted from a media metadata provider, wherein the raw media metadata comprises media metadata properties used as information populating an electronic program guide; and a second property table that includes multiple property instances of a second property type corresponding to a different one of the media metadata properties extracted from the raw media metadata;

a media item object table that includes multiple media item entries with no duplicates, each unique media item entry of the multiple media item entries is created for a media item extracted from the raw media metadata, and includes a bit mask and one or more references to at least some of the multiple property tables, wherein the bit mask indicates which of the multiple property tables are being referenced by the references;

a schedule object table that includes multiple schedule entries, each schedule entry of the multiple schedule entries referencing a single unique media item entry from among the multiple media item entries in the media item object table;

a station object table that includes multiple station entries; and a station entry of the multiple station entries referencing a single unique schedule entry from among the multiple schedule entries in the schedule object table.

14. The processor-accessible storage media as recited in claim 13, wherein a property table of the multiple property tables includes multiple value instances of the associated property type.

15. The processor-accessible storage media as recited in claim 14, wherein the property table includes an offset sub-table having multiple respective offsets referencing respective ones of the multiple value instances.

16. The processor-accessible storage media as recited in claim 15, wherein the references comprise indexes including an index referencing an offset of the multiple respective offsets of the offset sub-table; and wherein the offset references a value instance of the property table, the value instance associated with media item metadata corresponding to the media item entry having the index referencing the offset.

17. The processor-accessible storage media as recited in claim 16, wherein the indexes are scaled responsive to a total number of value instances in the property table, and the offsets are scaled responsive to a total size of the value instances of the property table.

18. The processor-accessible storage media as recited in claim 13, wherein the multiple property tables further comprise:

a value property table including an offset sub-table and a value sub-table, values in the value sub-table comprising value instances for media item metadata; and a key property table including an offset sub-table and a key sub-table, keys in the key sub-table defining a meaning of corresponding value instances of the value sub-table;

wherein the value property table and the key property table are referenced in pairs in at least some of the multiple media item entries.

* * * * *